(12) United States Patent
Lertrattanapanich et al.

(10) Patent No.: US 8,565,309 B2
(45) Date of Patent: Oct. 22, 2013

(54) SYSTEM AND METHOD FOR MOTION VECTOR COLLECTION FOR MOTION COMPENSATED INTERPOLATION OF DIGITAL VIDEO

(76) Inventors: Surapong Lertrattanapanich, Irvine, CA (US); Mahesh Chappalli, Irvine, CA (US); Yeong-Taeg Kim, Irvine, CA (US)

( * ) Notice: Subject to any disclaimer, the term of this patent is extended or adjusted under 35 U.S.C. 154(b) by 1485 days.

(21) Appl. No.: 11/846,464

(22) Filed: Aug. 28, 2007

(65) Prior Publication Data

US 2009/0060041 A1    Mar. 5, 2009

(51) Int. Cl.
*H04N 7/12* (2006.01)
*H04N 11/02* (2006.01)
*H04N 11/04* (2006.01)

(52) U.S. Cl.
USPC .................................................. 375/240.16

(58) Field of Classification Search
USPC .................................................. 375/240.16
See application file for complete search history.

(56) References Cited

U.S. PATENT DOCUMENTS

| | | |
|---|---|---|
| 4,890,160 A | 12/1989 | Thomas |
| 5,777,682 A | 7/1998 | De Haan et al. |
| 6,963,605 B2 * | 11/2005 | Laurent-Chatenet ......... 375/240 |
| 7,039,109 B2 | 5/2006 | Pelagotti et al. |
| 7,660,354 B2 * | 2/2010 | Shi et al. .................. 375/240.15 |
| 8,254,444 B2 * | 8/2012 | Chappalli ................ 375/240.09 |
| 2006/0262853 A1 * | 11/2006 | Li et al. .................... 375/240.16 |
| 2009/0060042 A1 | 3/2009 | Lertrattanapanich et al. |

FOREIGN PATENT DOCUMENTS

GB    2188510    9/1987

\* cited by examiner

*Primary Examiner* — Edan Orgad
*Assistant Examiner* — James Turchen
(74) *Attorney, Agent, or Firm* — IP Investment Law Group (57) ABSTRACT

A system and method of collection motion vectors for motion compensated interpolation of digital video are disclosed. For example, one embodiment includes a method of identifying motion vectors for interpolating a portion of a digital video signal. The method comprises identifying a plurality of motion vectors indicative of differences between first and second frames of a digital video signal and projecting each of the motion vectors to a location within a third frame at a time associated with the third frame. The method further includes determining a measure of overlap of each projected location with a portion of a third frame to be interpolated, selecting at least one motion vector based on the measure, and generating at least a portion of a third frame based on the selected at least one motion vector selected. Other embodiments include a system and device configured to perform the method.

20 Claims, 6 Drawing Sheets

SYSTEM AND METHOD FOR MOTION VECTOR COLLECTION FOR MOTION COMPENSATED INTERPOLATION OF DIGITAL VIDEO

BACKGROUND OF THE INVENTION

1. Field of the Invention

This application relates to frame interpolation in digital video. In particular, this application relates to systems and methods for determining motion vectors for motion compensated interpolation.

2. Description of the Related Technology

In recent years, advancements in digital video processing have allowed video display manufacturers to produce systems which provide a more realistic viewing experience by enhancing raw digital video. For example, one way of enhancing video materials is to increase the displayed frame rate by generating and displaying frames that are interpolated based on the content of previous and/or succeeding frames. For example, filmed video from sources such as motion pictures typically includes 24 frames per second (fps). Video devices often have refresh or display rates of 50 or 60 frames per second. One well known way to render 24 fps video at 60 fps is to repeat every 4th frame in a 2-3 pattern for progressive video or a 3:2 pulldown process that repeats fields of frames in a 3:2 pattern to produce an interlaced 60 fps video signal. In either case, the 3:2 pattern can result in jerky or jittery video that is particularly apparent during slow, steady camera movements. This artifact is commonly referred to as telecine judder. A way of enhancing display of 24 fps video is to interpolate frames to reach 60 fps rather than simply repeating frames to reduce or eliminate such judder. In addition, display or other video processing devices may utilize frame interpolation in other frame rate conversion applications or to interpolate frames of a video signal lost to signal or other noise.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved video quality and reduced visible artifacts in digital video data.

One embodiment includes a method of identifying motion vectors for interpolating a portion of a digital video signal. The method comprises identifying a plurality of motion vectors indicative of differences between first and second frames of a digital video signal and projecting each of the motion vectors to a location within a third frame at a time associated with the third frame. The method further includes determining a measure of overlap of each projected location with a portion of a third frame to be interpolated, selecting at least one motion vector based on the measure, and generating at least a portion of a third frame based on the selected at least one motion vector selected.

One embodiment includes a system for identifying motion vectors for interpolating a portion of a digital video signal. The system comprises a memory configured to store a plurality of motion vectors indicative of differences between first and second frames of a digital video signal. The system further comprises a processor configured to identify a plurality of motion vectors indicative of differences between first and second frames of a digital video signal, project each of the motion vectors to a location within a third frame at a time associated with the third frame, determine a measure of overlap of each projected location with a portion of a third frame to be interpolated, select at least one motion vector based on the measure, and generate at least a portion of a third frame based on the selected at least one motion vector.

One embodiment includes a system for identifying motion vectors for interpolating a portion of a digital video signal. The system comprises means for storing a plurality of a plurality of motion vectors indicative of differences between first and second frames of a digital video signal. The system further comprises means for processing the digital video signal. The processing means is configured to identify a plurality of motion vectors indicative of differences between first and second frames of a digital video signal, project each of the motion vectors to a location within a third frame at a time associated with the third frame, determine a measure of overlap of each projected location with a portion of a third frame to be interpolated, select at least one motion vector based on the measure, and generate at least a portion of a third frame based on the selected at least one motion vector.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

A video signal may be described in terms of a sequence of pictures, which include frames (an entire picture), or fields (e.g., an interlaced video stream comprises fields of alternating odd or even lines of a picture). As used herein, the term "frame" is broadly used to refer to a picture, a frame, or a field. Multimedia processors, such as video processors, may operate on a frame by partitioning it into blocks or "macroblocks" of, for example, 16×16 pixels. The processor may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a block or a subblock.

Video processors may take advantage of temporal redundancy in video data by representing a frame in terms of the difference between the frame and one or more reference frames. For example, video processors may use motion compensation based algorithms that match blocks of a source frame to portions of one or more other frames. The block of the source frame may be shifted in the frame relative to the matching portion of the reference frame. This shift is characterized by a motion vector. Any differences between the block and partially matching portion of the reference frame may optionally be characterized in terms of a residual. The video processor may thus represent a frame as data that comprises one or more of the motion vectors and residuals for a particular partitioning of the frame.

Such motion based representation of frames are often used to encode video data. Such representations can also be used to interpolate frames between frames of video data. Such motion compensated interpolation (MCI) systems may use a pair of two consecutive frames {PRE, CUR} in a motion video signal and an estimated motion vector field (MVF) describing the motion vectors relative to the two frames. The motion vectors are used to interpolate blocks of one or more frames between the PRE and CUR frames. The interpolated frame is then stored and/or output for further processing or display.

Figure 1:
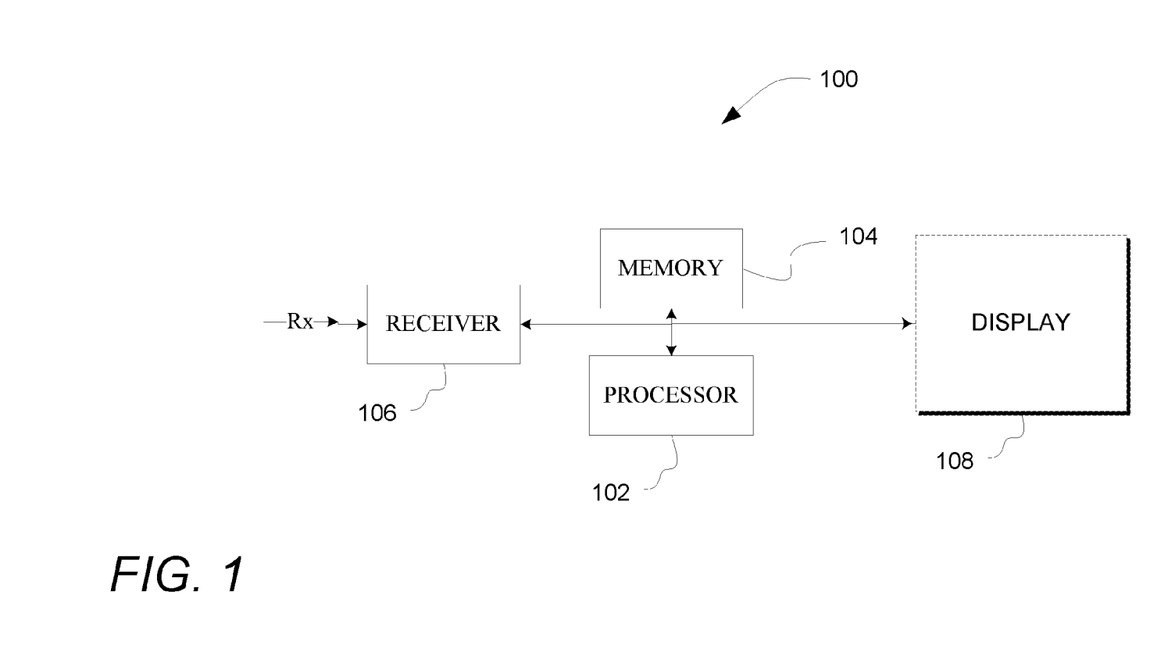
FIG. 1 is a block diagram illustrating components of an apparatus configured to process received video signals.

FIG. 1 is a block diagram illustrating components of an apparatus 100 configured to process received video signals. Such video processing may include interpolating frames of video data. The apparatus 100 may be embodied as a video display, a digital video player and/or recorder, a stand-alone video processor or receiver, or any other suitable device or system that is configured to receive video signals, and process or the received display video signals, including mobile or handheld devices. The apparatus includes a processor 102, a memory 104, and a video receiver 106. The process 102 may include one or more of a general purpose processor and digital signal processor. The memory 104 may include volatile and non-volatile storage such as RAM, flash memory, disk storage, or any other storage medium suitable for storing digital video and processing related data. The receiver 106 includes any suitable apparatus for receiving digital video data including, for example, an ATSC or QAM television receiver, a component or HDMI receiver, a network receiver such as a cable modem, Ethernet or any other suitable data network receiver. The system 100 may optionally include, or be in communication with, a display 108 configured to display the digital video.

Figure 2:
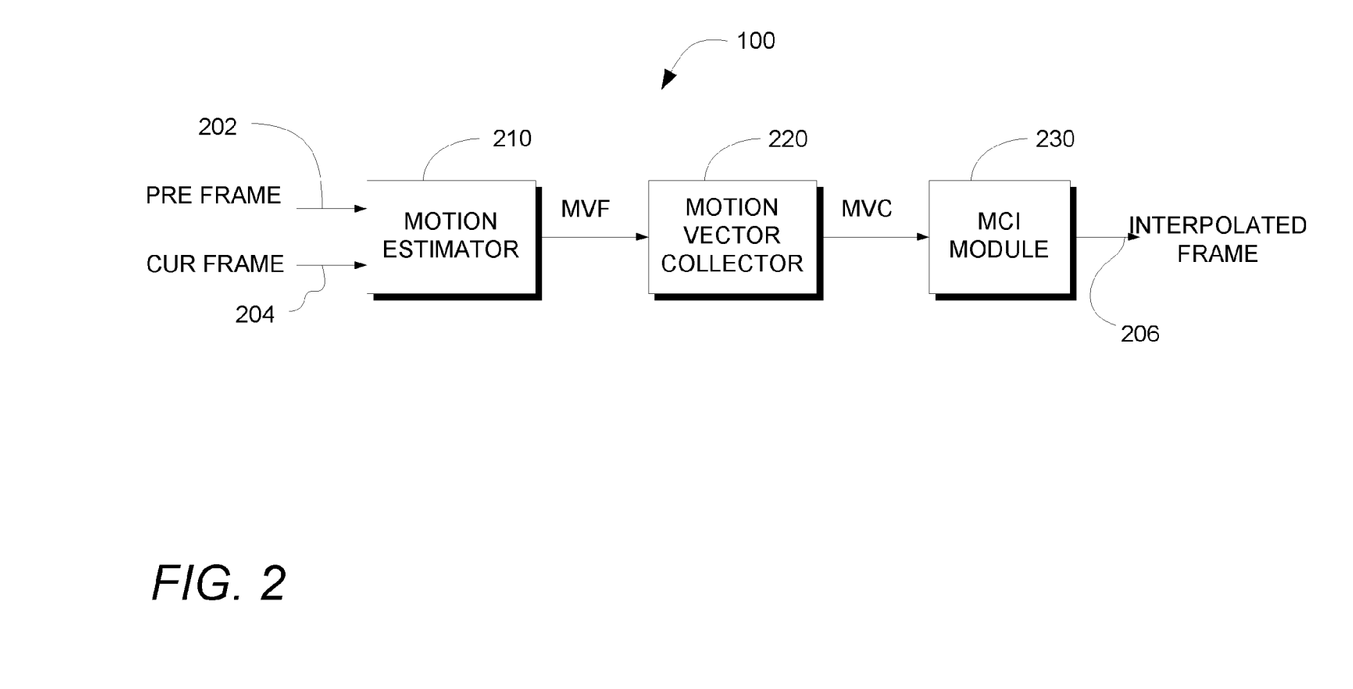
FIG. 2 is a block diagram illustrating one embodiment of an apparatus for interpolating digital video data.

FIG. 2 is a block diagram illustrating one embodiment of the apparatus 100 that is configured to interpolate digital video data. A motion estimator 210 receives two frames, e.g., consecutive frames labeled PRE (previous) 202, e.g., corresponding to a time t in the motion video signal, and CUR (current) 204, corresponding to a time t+1 in the motion video signal. The motion estimator 210 uses the frames 202 and 204 to estimate a motion vector field (MVF) that describes changes or motion in blocks of data between the frame 202 and the frame 204. The motion estimator 210 may use any suitable method of motion estimation, including those known in the art. A motion vector collector 220 receives the MVF and collects motion vectors to define a motion vector collection (MVC) for interpolation of blocks in the interpolated frame. The motion compensated interpolation (MCI) module 230 uses the MVC and other data such as the PRE frame 202 and CUR frame 204 to generate an interpolated frame 206 at a time t+α. The MCI module 230 may use any suitable method of interpolation based on the MVC, including methods known in the art.

It has been found that the MCI module 230 obtains better results for interpolated frames (e.g., frames having fewer interpolation artifacts) if two or more motion vectors per block are used to better handle occlusion. (Conceptually, occlusion occurs when there are multiple objects in the frame 202 moving through a block of interest (BOI) (e.g., a particular block being interpolated in the frame 206) with different speeds or direction when projected to the time t+α.) Mathematically, the interpolation performed by the MCI module 230 may be represented in terms of a set or collection of K motion vectors V={$v_1, v_2, \ldots, v_K$}, two consecutive frames PRE I(x,y,t) and CUR I(x,y,t+1) provided to the MCI module 230. Specifically, the MCI result I(x,y,t+α) at coordinate (x,y) in the interpolated frame 206 and time instant t+α may be calculated based on the below relation:

$$I(x, y, t+\alpha) = \frac{\sum_{k=1}^{K} w_k [\beta \cdot I(x - \alpha \cdot v_x^k, y - \alpha \cdot v_y^k, t) + \alpha \cdot I(x + \beta \cdot v_x^k, y + \beta \cdot v_y^k, t+1)]}{\sum_{k=1}^{K} w_k}, \quad (1)$$

where $0 \leq \alpha < 1$, $\beta = 1 - \alpha$ and $w_k$ is a reliability associated with motion vector $v_k = [v_x^k \; v_y^k]$. The reliability $w_k$ of a motion vector $v_k$ may be estimated using any suitable method, including, for example, based on the sum of absolute difference (SAD) between a group of pixels (GOP) centered about locations associated with the motion vector $v_k$ in the PRE and CUR frames. The SAD represents the similarity between those two GOPs. Once the SAD is obtained, the weight $w_k$ may be computed as the inverse proportion to the SAD result. That is, the more similar between GOPs, the higher weight. As is apparent from Equation 1, the quality of such interpolation may depend on the selection of the motion vector collection used by the MCI module 230. Accordingly, one embodiment includes a method of motion vector collection, such as for use in the motion vector collector 220. For example, in one embodiment, motion vectors to be used for interpolating a particular block, e.g., the block of interest (BOI), are selected corresponding to the BOI and neighboring blocks in the PRE frame. In one embodiment, described in more detail below, motion vectors passing through or near the BOI when projected to time t+α are selected. For example, in one such embodiment, motion vectors are selected based on the amount of overlap (e.g., overlapping pixels) between the BOI and the motion vector as projected to time t+α.

Figure 3:
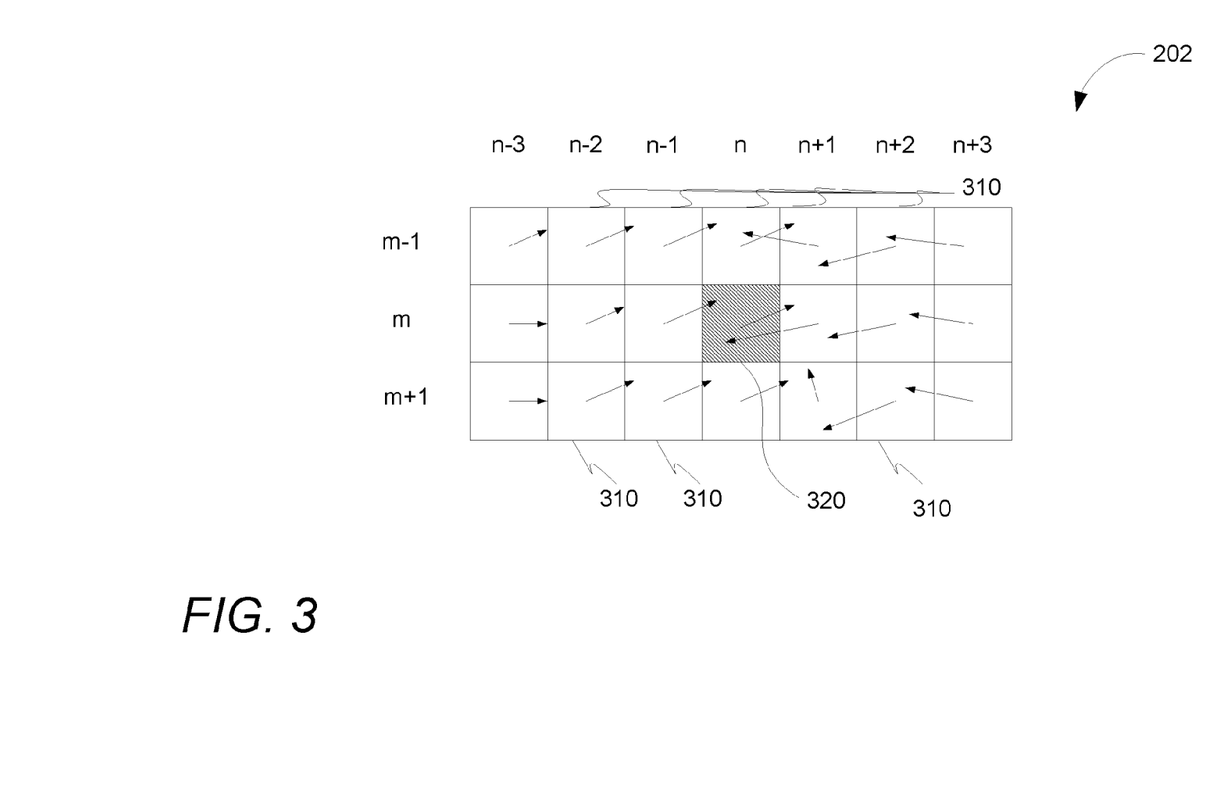
FIG. 3 is a diagram illustrating motion vector data of a frame of video data.

FIG. 3 is a diagram illustrating motion vectors 310 data of blocks of the PRE frame 202 (with, for example, the motion being with reference to the CUR frame 204). The blocks, and their corresponding motion vectors 310 are arranged in rows n and columns m. However, other arrangements may be used, including block partitions that change dynamically from frame to frame. The motion vector associated with each block defines a two-dimensional motion is illustrated coming out of the page at the viewer. For illustration purposes, a particular block of interest (BOI) 320 is indicated at row n and column m with darker hatching in that particular block. In one embodiment, each of the N=21 motion vectors 310 (selected from neighboring blocks of columns n−3 to n+3 in adjacent rows (m−1 to m+1)) comprises the candidate set from which the motion vector collector 220 selects and collects motion vectors 310 for use by the MCI module 230 to interpolate the block 320 of the interpolated frame 206. Other embodiments may use other ways of selecting the candidate set, including selecting motion vectors from different numbers of neighbors or differently shaped neighbor regions.

Figure 4:
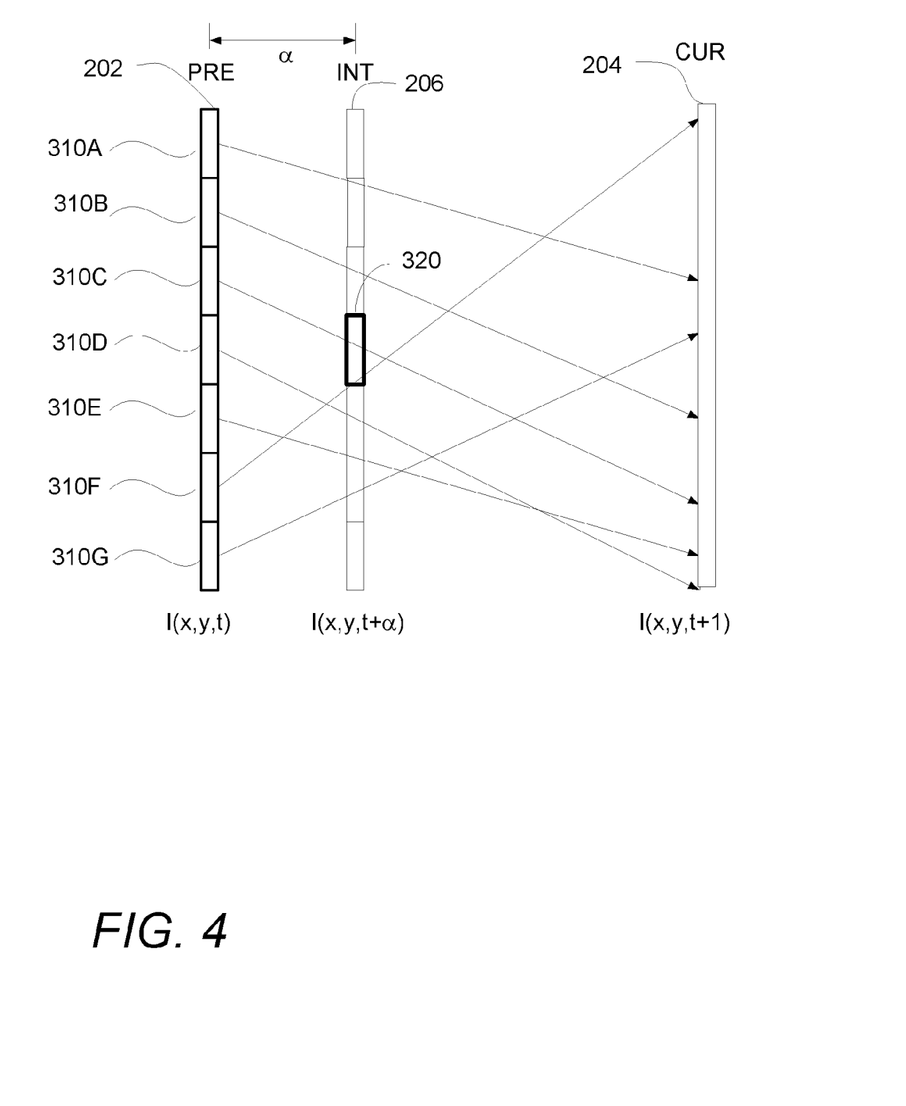
FIG. 4 is a series of one dimensional diagrams illustrating the vertical location of motion vectors within two frames at times t and t+1 and in an interpolated frame at time t+$\alpha$.

FIG. 4 is a series of one dimensional diagrams illustrating the vertical location of motion vectors within the PRE frame 202 at time t, the CUR frame 204 at time t+1, and in the interpolated frame 206 at time t+α. Note that α may be selected to achieve a desired pacing of frames and may thus vary from one interpolated frame to the next. Moreover, more than one frame 206 may be interpolated between particular frames 202 and 204. As illustrated, the motion vectors 310A-E (collectively 310), which correspond to blocks of the PRE frame 202, may be derived based on matching the blocks of the PRE frame 202 with portions of the CUR frame 204 at time t+1 (note that the portions of the CUR frame 204 that match the blocks 202 from the PRE frame may not align with the blocks of the CUR frame 204, may overlap with each other, and may not correspond or cover all portions of the CUR frame 204). As noted above, the PRE frame 202 may be represented by I(x,y,t), the CUR frame 204 may be represented by, I(x,y,t+1) and the interpolated frame 206 may be represented by I(x,y,t+α) in equation 1. One embodiment includes a way to obtain a set of motion vectors $V=\{v_1, v_2, \ldots, v_K\}$ from the candidate set (CS) of motion vectors 310 collected from blocks spatially proximate to the BOI 320 that are used to interpolate the BOI 320 of the interpolated frame 206. For example, in one embodiment, motion vectors 310 are selected based on the number of motion vectors 310 that pass through each BOI 320 of the frame 206. For example, in FIG. 4, the motion vectors 310C and 310F pass through the BOI 320 at time t+α. In one embodiment, the motion vector collector 230 collects motion vectors 310 based on spatial proximity or overlap with the BOI 320.

Figure 5:
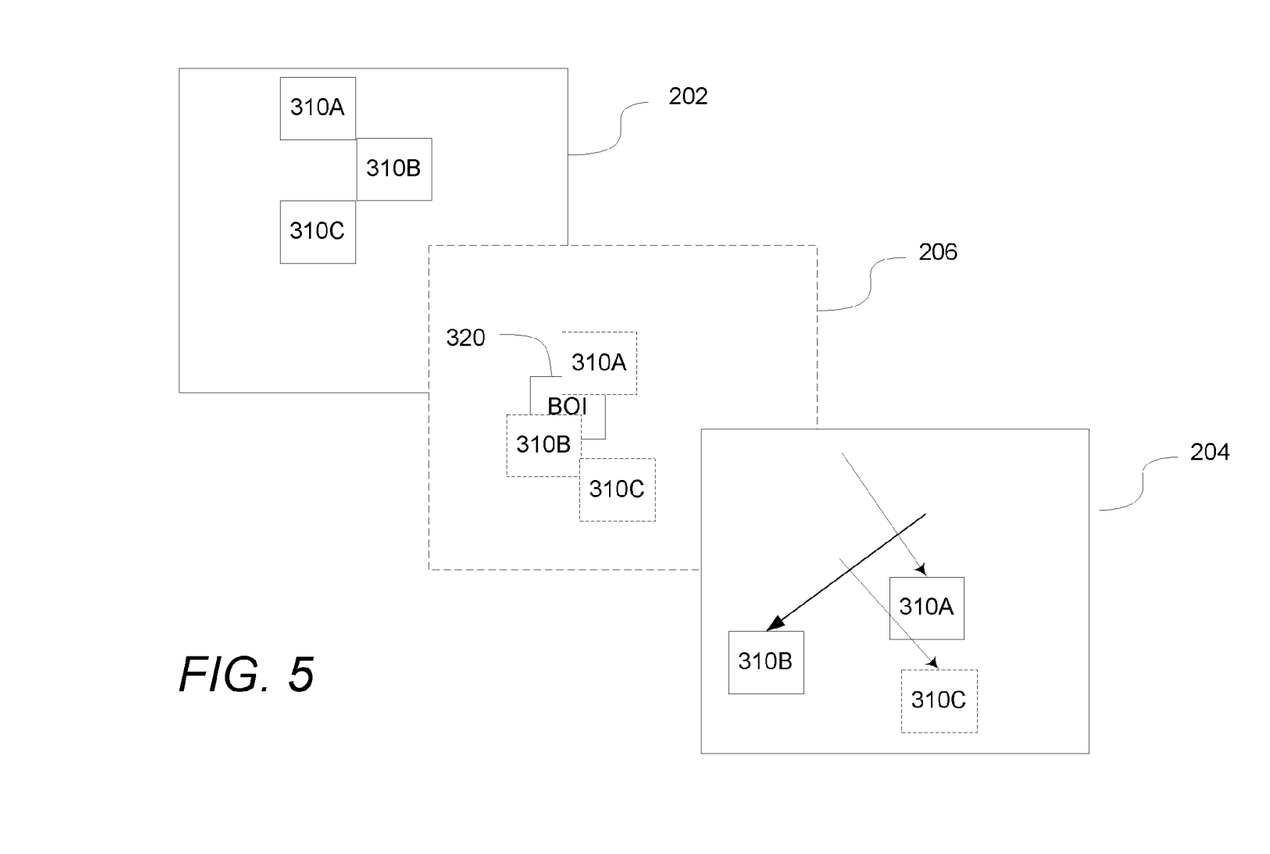
FIG. 5 is a series of two dimensional diagrams illustrating the location of motion vectors such as illustrated in FIG. 4.

FIG. 5 is a series of two dimensional diagrams illustrating the location of a set of motion vectors in an example of the PRE frame 202 at time t, the CUR frame 204 at time t+1, and in the interpolated frame 206 at time t+α. Motion vectors 310A, 310B, and 310C are examples of three motion vectors within the proximity of the location of the BOI 320. The projection of these vectors in the CUR frame 204 illustrates their relative motion within the frame. When the motion vectors 310A, 310B, and 310C are projected onto the interpolated frame 206, the motion vectors 310A and 310B overlap with the BOI 320 but the motion vector 310C does not. Therefore, the motion vector collector 220 may be configured to select the motion vectors 310A and 310B as well as their neighbors for further interpolation based on this overlap with the BOI 320 and selecting at least one motion vector having the greatest amount of overlap amongst the plurality of motion vectors.

It has been found that good interpolation results (e.g., fewer visible artifacts) can be achieved by projecting the motion vectors 310 to the time t+α of the interpolated frame 206 and selecting motion vectors 310 based on the amount of overlap and spatial proximity of the motion vectors 310 with the BOI 320 at the projected time. Thus, one embodiment includes a method of selecting motion vectors based on the spatial proximity and overlap of motion vectors 310 to the position of the BOI 320 at the time t+α.

Figure 6:
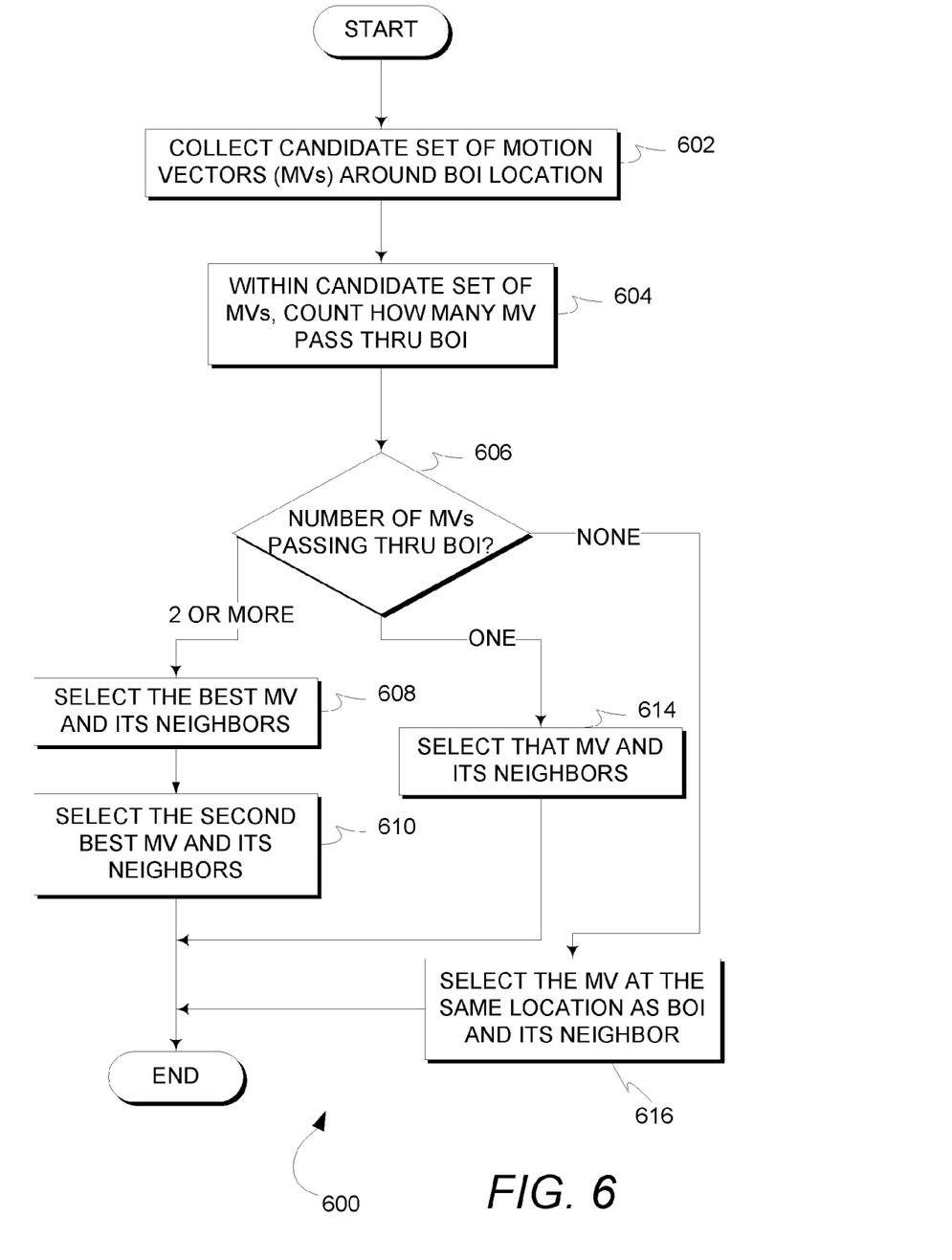
FIG. 6 a flowchart illustrating one embodiment of a method of selecting vectors for interpolating a frame.

FIG. 6 is a flowchart illustrating one embodiment of a method 600 of selecting motion vectors 310 for interpolating the frame 206. The method 600 includes selecting motion vectors V as input vectors for the MCI module 230 to receive and use for interpolating the frame 206. As noted above, the motion vector collector 220 receives as input a motion vector field of motion vectors 310 derived from the PRE frame 202 and the CUR frame 204.

The method 600 begins a block begins at a block 602 in which the processor 102 collects a candidate set $CS=\{v_1, v_2, \ldots, v_N\}$ of motion vectors (from the motion vector field from the PRE frame 202 to the CUR frame 204). In one embodiment, the candidate set is set to include motion vectors from blocks adjacent to the BOI 320. For example, the candidate set may be initialized to motion vectors from N=21 adjacent, or spatially proximal, blocks 310 as illustrated with reference to FIG. 3. In other embodiments, N may include, for example, 9 or 5 spatially proximal blocks. A collection V, a set of selected motion vectors for interpolating the BOI 320, is also initialized to the empty set.

Moving to a block 604, the processor 102 determines, within candidate set of motion vectors 310, a count of how many projections of the motion vectors 310 pass thru the BOI 320 at the time t+α of the interpolated frame 206. In one embodiment, the processor 102 determines whether the projection of each motion vector 310 passes through the BOI 320 by calculating the overlap area between the projection of each motion vector 310 and the BOI 320 in the frame 206 at time t+α. For example, in one embodiment, for each motion vector 310, $v_i \in CS$, $B_i$ may denote the block corresponding to the vector $v_i$. The processor 102 computes the overlap area between the projection of $B_i$ onto the BOI 320 of the interpolated frame 206. If the overlap area is non zero, then the corresponding motion vector 310 is identified as passing through the BOI 320. The processor 102 processes each motion vector 310 accordingly and generates a count of how many $B_i$ corresponding to motion vector $v_i$ passes through each BOI 320.

Next at a decision block 606, the processor 102 determines how many projections of the motion vectors 310 pass through the BOI 320, e.g., based on the counts determined at the block 604. When two or more motion vectors 310 pass through the block 320, occlusion may occur due to multiple blocks or objects moving through the same area at the same time, t+α. Better interpolation results may be achieved in such cases by basing the interpolation on more motion vectors, including motion vectors 310 associated with each such possibly occluding object. Accordingly, if two or more projected motion vectors 310 are found to pass through the BOI 320, the method 600 proceeds to a block 608 in which the motion vector 310 having the highest or best value of a metric, such as the largest overlap area with the BOI 320, as well as its immediate neighboring motion vectors 310 (e.g., motion vectors associated with neighboring m±1 and n±1 blocks as illustrated in FIG. 3), are added to the collection V. Moving to a block 610, the processor 102 selects the motion vectors 310 having the second highest or second best value of a metric, such as the second largest overlap area, as well as its immediate neighboring motion vectors 310 (e.g., motion vectors associated with neighboring m±1 and n±1 blocks as illustrated in FIG. 3), and adds the selected motion vectors to the collection V.

Returning to the decision block 606, if a single projected motion vector 310 passes through the BOI 320 at the time t+α of the interpolated frame 206, the method 600 proceeds to a block 614 in which the processor 102 adds that motion vector and its neighboring motion vectors to the collection V. If at the decision 606, no projected motion vectors pass through the BOI 320, the method 600 proceeds to a block 616 in which the processor 102 selects the motion vector 310 corresponding to the same location as the BOI 320 in the PRE frame 202. The processor adds this motion vector 310 and its neighbors to the collection V. In one embodiment, the number of neighboring motion vectors added to the collection V at the blocks 608, 610, 614, and 616 may be based on a specified or predetermined size of the collection V.

It is to be recognized that the foregoing description of one embodiment of the method 600 illustrates operation for a particular BOI 320 at block m, n. In one embodiment, the method 600 is repeated for each such BOI of the interpolated frame 106. As noted above, a different numbers of motion vectors may be selected for particular BOIs 320 for different blocks or interpolated frames. The selected motion vectors for each BOI 320 may then be used by the MCI module 230 to interpolate the 320 in the INT frame 206, e.g., based on equation 1.

In view of the above, one will appreciate that the invention overcomes the problem of collecting motion vectors for motion compensated interpolation. For example according to one embodiment, a number of motion vectors (e.g., three motion vectors) is selected for each BOI based on a motion vectors selected according the method 600 illustrated in FIG. 6, e.g., based on the amount of overlap of projections of motion vectors 310 with the BOI 320. By identifying and handling the case of occlusion with additional selection motion vectors, the MCI module 320 can interpolate the frame 206 with fewer interpolation artifacts.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of operating a digital video system comprising:
    identifying a plurality of candidate motion vectors indicative of differences between first and second frames of a digital video signal;
    projecting each of the candidate motion vectors to a location within a third frame at a time associated with the third frame;
    determining a count of the candidate motion vectors passing through the location within the third frame;
    determining a measure of overlap of each projected location with a portion of the third frame to be interpolated;
    selecting at least one motion vector based on the measure; and
    generating at least a portion of a third frame based on a reliability associated with each of the selected at least one motion vector;
    wherein selecting the at least one motion vector includes selecting:
        a first motion vector having the highest measure of overlap from the candidate motion vectors and the immediately neighboring motion vectors of the first motion vector; and
        a second motion vector having the second highest measure of overlap from the candidate motion vectors and the immediately neighboring motion vectors of the second motion vector.

2. The method of claim 1, further comprising:
    outputting the third frame in an output digital video signal between the first and second frames; and
    displaying the third frame between the first and second frames.

3. The method of claim 1, wherein the time associated with the third frame is between times associated with each of the first and second frames.

4. The method of claim 1, wherein the projected location comprises at least one pixel of the third frame.

5. The method of claim 1, wherein the measure of overlap comprises a number of overlapping pixels.

6. The method of claim 1, wherein selecting at least one motion vector further comprises selecting at least one additional motion vector spatially proximal to the selected at least one motion vector.

7. The method of claim 6, wherein the selected at least one additional motion vector spatially proximal to the selected at least one motion vector is adjacent to the selected at least one motion vector.

8. The method of claim 1, wherein generating the at least a portion of a third frame based on the at least selected one motion vector comprises generating a block of the third frame based on the at least one motion vector.

9. A digital video system comprising:
a memory configured to store a plurality of candidate motion vectors indicative of differences between first and second frames of a digital video signal; and
a processor configured to:
identify a the plurality of candidate motion vectors indicative of differences between first and second frames of a digital video signal;
project each of the motion vectors to a location within a third frame at a time associated with the third frame;
determine a count of the candidate motion vectors passing through the location within the third frame;
determine a measure of overlap of each projected location with a portion of the third frame to be interpolated;
select at least one motion vector based on the measure; and
generate at least a portion of a third frame based on a reliability associated with each of the selected at least one motion vector;
wherein the processor is configured to select the at least one motion vector includes:
a first motion vector having the highest measure of overlap from the candidate motion vectors and the immediately neighboring motion vectors of the first motion vector; and
a second motion vector having the second highest measure of overlap from the candidate motion vectors and the immediately neighboring motion vectors of the second motion vector.

10. The system of claim 9, further comprising:
a receiver configured to receive the first and second frames; and
a display configured to display the third frame between the first and second frames.

11. The system of claim 9, wherein the time associated with the third frame is between times associated with each of the first and second frames.

12. The system of claim 9, wherein the measure of overlap comprises a number of overlapping pixels.

13. The system of claim 9, wherein the processor is further configured to select at least one additional motion vector that is spatially proximal to the selected at least one motion vector.

14. The system of claim 13, wherein the selected at least one additional motion vector is adjacent to the selected at least one motion vector.

15. The system of claim 9, wherein the processor is configured to generate at least one block of the third frame based on the selected at least one motion vector.

16. A digital video system comprising:
means for storing a plurality of a plurality of candidate motion vectors indicative of differences between first and second frames of a digital video signal; and
means for processing the digital video signal, the processing means being configured to:
identify the plurality of candidate motion vectors indicative of differences between first and second frames of a digital video signal;
project each of the motion vectors to a location within a third frame at a time associated with the third frame;
determine a count of the candidate motion vectors passing through the location within the third frame;
determine a measure of overlap of each projected location with a portion of the third frame to be interpolated;
select at least one motion vector based on the measure; and
generate at least a portion of a third frame based on a reliability associated with each of the selected at least one motion vector;
wherein the means for processing the digital video signal is configured to select the at least one motion vector includes:
a first motion vector having the highest measure of overlap from the candidate motion vectors and the immediately neighboring motion vectors of the first motion vector; and
a second motion vector having the second highest measure of overlap from the candidate motion vectors and the immediately neighboring motion vectors of the second motion vector.

17. The system of claim 16, further comprising:
means for receiving the first and second frames; and
means for displaying the third frame between the first and second frames, wherein the time associated with the third frame is between times associated with each of the first and second frames.

18. The system of claim 16, wherein the processing means is configured to select at least one motion vector having the greatest amount of overlap amongst the plurality of motion vectors, wherein the measure of overlap comprises a number of overlapping pixels.

19. The system of claim 18, wherein processing means is further configured to select at least one additional motion vector that is spatially proximal to the selected at least one motion vector, wherein the selected at least one additional motion vector is adjacent to the selected at least one motion vector.

20. The system of claim 16, wherein the processor is configured to generate at least one block of the third frame based on the selected at least one motion vector.

\* \* \* \* \*